(12) United States Patent
Sun et al.

(10) Patent No.: US 9,002,001 B1
(45) Date of Patent: *Apr. 7, 2015

(54) PRIME FIELD ELLIPTIC CURVE CRYPTOGRAPHY PROCESSOR

(71) Applicant: Marvell International Ltd., Hamilton (BM)

(72) Inventors: Fei Sun, Santa Clara, CA (US); Chang Shu, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 148 days.

This patent is subject to a terminal disclaimer.

(21) Appl. No.: 13/747,096

(22) Filed: Jan. 22, 2013

Related U.S. Application Data

(63) Continuation of application No. 12/713,297, filed on Feb. 26, 2010, now Pat. No. 8,358,779.

(60) Provisional application No. 61/157,588, filed on Mar. 5, 2009.

(51) Int. Cl.
*G06F 21/00* (2013.01)
*H04L 9/30* (2006.01)

(52) U.S. Cl.
CPC .................................... *H04L 9/3066* (2013.01)

(58) Field of Classification Search
None
See application file for complete search history.

(56) References Cited

U.S. PATENT DOCUMENTS

2003/0206629 A1 11/2003 Eberle et al.

OTHER PUBLICATIONS

V.S. Miller, "Use of Elliptic Curves in Cryptography", in Proc. Adv. Cryptolog. (Crypto '85), 1986, pp. 417-426.
G. Agnew, R. Mullin, I. Onyszchuk and S. Vanstone, "An Implementation of Elliptic Cruve Cryptosystems Over $F_2^{155}$," IEEE J. Selected Areas Communications, vol. 11, pp. 804-813, Jun. 1993.
S. Sutikno, A. Surya, and R. Effendi, "An Implementation of ElGamal Elliptic Curve Cryptosystems," Proc. 1998 IEEE Asian Pacific Conf. Circuits and Systems (APCCAS '98), pp. 483-486, Nov. 1998.
G. Orlando and C. Paar, "A High-Performance Reconfigurable Elliptic Curve Processor for GF (2m)," Proc. Cryptographic Hardware and Embedded Systems (CHES 2000), pp. 41-56, Aug. 2000.
T. Izu and T. Takagi, "Fast Elliptic Curve Multiplications Resistant Against Side Channel Attacks," IEICE Transactions on Fundamentals, vol. E88-A, No. 1, Jan. 2005.
P.L. Montgomery, "Modular Multiplication Without Trial Division," Mathematics of Computation, 44 (170):519-521, Apr. 1995.
Montgomery, Peter L., "Speeding the Pollard and Elliptic Curve Methods for Factorization", Mathematics of Computation, vol. 18, Issue 177 (Jan. 1987) pp. 213-261. JSTOR.
Koblitz, Neal, "Elliptic Curve Cryptosystems", Mathematics of Computation, vol. 48, No. 177 (Jan. 1987) pp. 203-209.

*Primary Examiner* — Benjamin Lanier

(57) ABSTRACT

A system including a processor, a field addition circuit, and a field multiplication circuit. The processor is configured to execute instructions for performing elliptic curve operations on data. The elliptic curve operations include field operations performed in a prime field. The field addition circuit is configured to perform a field addition on the data in the prime field in response to the instructions requiring the field addition. The field multiplication circuit is configured to perform a field multiplication on the data in the prime field in response to the instructions requiring the field multiplication.

8 Claims, 19 Drawing Sheets

| opcode (8-bit) | operand (8-bit) |
|---|---|

Instruction format for Type I instructions

| opcode (8-bit) | operand1 (4-bit) | operand2 (4-bit) |
|---|---|---|
| reserved | operand3 (4-bit) | operand4 (4-bit) |

Instruction format for Type II instructions

FIG. 3

INPUTS:      $A = (A_7, \ldots, A_1, A_0)$ in base $2^{32}$ with $0 \leq A < P_{256}$
                   $B = (B_7, \ldots, B_1, B_0)$ in base $2^{32}$ with $0 \leq B < P_{256}$ OUTPUT:     $Z = (A+B) \bmod P_{256}$ // Z is a 256-bit integer Algorithm:

Ca = 0;
                   for i=0 to 7 do
                           $\{Ca, S_i\} = A_i + B_i - P_{256\,i} + Ca;$ // perform $A+B-P_{256}$
                   end
                   if (Ca ==0) return Z = S;
                   else return $Z = S + P_{256};$

*FIG. 6*

INPUTS: $A = (A_{15}, A_{14}, ..., A_2, A_1, A_0)$ in base $2^{16}$ with $0 \leq A < P_{256}$
$B = (B_{15}, B_{14}, ..., B_2, B_1, B_0)$ in base $2^{16}$ with $0 \leq B < P_{256}$
OUTPUT: $S = (S_{31}, S_{30}, ..., S_1, S_0)$ in base $2^{16}$
$Ca = (Ca_{15}, Ca_{14}, ..., Ca_1, Ca_0)$ in base $2^{16}$
Algorithm:

Initialize S and Ca registers as zero;    // S is a register array of 32x16
                                                                                // Ca is a carry register array of 16x2
    for i=0 to 15 do
        $C = A_i * B$;  // $C = (C_{31}, C_{30}, ..., C_2, C_1, C_0)$ in base $2^{16}$
        for j=0 to 15 do
            $\{Ca_j, S_{j+15}\} = S_{j+15+1} + Ca_j + C_{2j} + C_{2j-1}$; // $C_{-1}=0$
        end
        $S_{31} = C_{31}$;
        for j=0 to 14 do
            $S_j = S_{j+1}$;
        end
    end
    return (S and Ca).

*FIG. 9*

INPUTS: $S = (S_{31}, S_{30}, \ldots, S_1, S_0)$ in base $2^{16}$
$Ca = (Ca_{15}, Ca_{14}, \ldots, Ca_1, Ca_0)$ in base $2^{16}$ OUTPUT: $Z = A \times B \bmod P_{256}$ Algorithm:

Initialize two 256-bit integer R and K in base $2^{32}$.
$R = (R_{15}, R_{14}, \ldots, R_1, R_0) = (\{S_{31}, S_{30}\}, \{S_{29}, S_{28}\}, \ldots, \{S_1, S_0\})$;
$K = (K_{15}, K_{14}, \ldots, K_1, K_0) = (\{Ca_{15}<<16\}+Ca_{14}\}, \{Ca_{13}<<16\}+Ca_{12}\}, \ldots,$
$\{Ca_1<<16\}+Ca_0\}, \{0x0\}, \ldots, \{0x0\})$;

Define 256-bit integers in base $2^{32}$ as below:
$X_1 = (R_7, R_6, R_5, R_4, R_3, R_2, R_1, R_0)$;    $X_2 = (R_{15}, R_{14}, R_{13}, R_{12}, R_{11}, 0, 0, 0)$;
$X_3 = (0, R_{15}, R_{14}, R_{13}, R_{12}, 0, 0, 0)$;    $X_4 = (R_{15}, R_{14}, 0, 0, 0, R_{10}, R_9, R_8)$;
$X_5 = (R_8, R_{13}, R_{15}, R_{14}, R_{13}, R_{11}, R_{10}, R_9)$;    $X_6 = (R_{10}, R_8, 0, 0, 0, R_{13}, R_{12}, R_{11})$;
$X_7 = (R_{11}, R_9, 0, 0, R_{15}, R_{14}, R_{13}, R_{12})$;    $X_8 = (R_{12}, 0, R_{10}, R_9, R_8, R_{15}, R_{14}, R_{13})$;
$X_9 = (R_{13}, 0, R_{11}, R_{10}, R_9, 0, R_{15}, R_{14})$;

$Y_1 = (K_7, K_6, K_5, K_4, K_3, K_2, K_1, K_0)$;    $Y_2 = (K_{15}, K_{14}, K_{13}, K_{12}, K_{11}, 0, 0, 0)$;
$Y_3 = (0, K_{15}, K_{14}, K_{13}, K_{12}, 0, 0, 0)$;    $Y_4 = (K_{15}, K_{14}, 0, 0, 0, K_{10}, K_9, K_8)$;
$Y_5 = (K_8, K_{13}, K_{15}, K_{14}, K_{13}, K_{11}, K_{10}, K_9)$;    $Y_6 = (K_{10}, K_8, 0, 0, 0, K_{13}, K_{12}, K_{11})$;
$Y_7 = (K_{11}, K_9, 0, 0, K_{15}, K_{14}, K_{13}, K_{12})$;    $Y_8 = (K_{12}, 0, K_{10}, K_9, K_8, K_{15}, K_{14}, K_{13})$;
$Y_9 = (K_{13}, 0, K_{11}, K_{10}, K_9, 0, K_{15}, K_{14})$;

// Carry_R1 is 5-bit signed integer and Sum_R1 is 256-bit integer
$\{Carry\_R1, Sum\_R1\} = X_1 + 2X_2 + 2X_3 + X_4 + X_5 - X_6 - X_7 - X_8 - X_9 + Y_1 + Y_2 + Y_3 + Y_4 + Y_5 - Y_6 - Y_7 - Y_8 - Y_9$;
(EQ1)

// Carry_R2 is a sign bit and Sum_R2 is 256-bit integer
if (Carry_R1>=0)
  $\{Carry\_R2, Sum\_R2\} = \{Carry\_R1, Sum\_R1\} - (Carry\_R1+1) \times P_{256}$;    (EQ2)
else
  $\{Carry\_R2, Sum\_R2\} = \{Carry\_R1, Sum\_R1\} - (Carry\_R1) \times P_{256}$;

if (Carry_R2==0) return Z = Sum_R2;
else return $Z = \{Carry\_R2, Sum\_R2\} + P_{256}$;    (EQ3)

FIG. 10

INPUTS:     $A = (A_x, A_y)$ and $B = (B_x, B_y)$ are the two distinct points on the EC curve.
OUTPUT:     $Z = (Z_x, Z_y)$
Algorithm:

$R_3 = A_x$; $R_4 = A_y$; $R_2 = B_x$; $R_5 = B_y$;

$R_{10}$ = SUB($R_3$, $R_2$); // modular subtraction: $R_3$-$R_2$
$R_8$ = SUB($R_4$, $R_5$); // modular subtraction $R_4$-$R_5$
$R_9$ = ADD($R_3$, $R_2$); // modular addition: $R_3$+$R_2$
$R_{11}$ = INV($R_{10}$); // modular inversion
$R_{10}$ = MUL($R_{11}$, $R_8$); $R_{11}$ = MUL($R_{10}$, $R_{10}$);
$R_6$ = SUB($R_{11}$, $R_9$); // This is $Z_x$
$R_{11}$ = SUB($R_3$, $R_6$); $R_8$ = MUL($R_{10}$, $R_{11}$);
$R_7$ = SUB($R_8$, $R_4$); // This is $Z_y$ return ($R_6$, $R_7$).

FIG. 14

INPUTS:     A = ($A_x$, $A_y$) and a
OUTPUT:     Z = ($Z_x$, $Z_y$)
Algorithm:

$R_3$=$A_x$; $R_4$=$A_y$; $R_0$=a;

$R_8$ = MUL($R_3$, $R_3$);
$R_{11}$ = ADD($R_0$, $R_8$); $R_8$ = ADD($R_8$, $R_8$); $R_9$ = ADD($R_3$, $R_3$);
$R_{10}$ = ADD($R_4$, $R_4$); $R_8$ = ADD($R_8$, $R_{11}$);
$R_{11}$ = INV($R_{10}$);
$R_{10}$ = MUL($R_{11}$, $R_8$); $R_{11}$ = MUL($R_{10}$, $R_{10}$);
$R_6$ = SUB($R_{11}$, $R_9$); // This is $Z_x$
$R_{11}$ = SUB($R_3$, $R_6$); $R_8$ = MUL($R_{10}$, $R_{11}$);
$R_7$ = SUB($R_8$, $R_4$); // This is $Z_y$ return ($R_6$, $R_7$).

FIG. 15

INPUTS:      $P_0$ and $k = (k_{l-1}, k_{l-2}, \ldots, k_0)_2$, $k_{l-1}=1$
OUTPUT:      $k \times P_0$
Algorithm:

$Q = P_0$ and $P = 2P_0$
    for i=l-2 downto 0 do
        if $k_i = 1$ then
            $Q = P+Q$; $P = 2P$;
        else
            $Q = 2Q$; $P = P+Q$;
    end
    return Q;

*FIG. 16*

INPUTS:   $P_0$ ($P_{0x}$, $P_{0y}$), a and b
OUTPUT:   $P = P_0$ ($P_x$, $P_z$) and $Q = 2P_0$ ($Q_x$, $Q_z$) under projective coordinate Algorithm:   $R_3 = P_{0x}$; $R_0 = a$; $R_1 = b$;

$R_8 = MUL(R_3, R_3)$;
$R_{10} = SUB(R_8, R_0)$; $R_{11} = ADD(R_8, R_0)$; $R_{13} = ADD(R_1, R_1)$; $R_{12} = ADD(R_3, R_3)$;
$R_{10} = MUL(R_{10}, R_{10})$; $R_{11} = MUL(R_{11}, R_{12})$; $R_8 = MUL(R_{12}, R_{13})$;
$R_{11} = ADD(R_{11}, R_{11})$; $R_8 = ADD(R_8, R_8)$; $R_{11} = ADD(R_{11}, R_{13})$;
$R_{10} = SUB(R_{10}, R_8)$; $R_{11} = ADD(R_{11}, R_{13})$;

$P_x = R_3$; $P_z = 1$; $Q_x = R_{10}$; $Q_z = R_{11}$;
return Q and P;

FIG. 17

INPUTS:     P ($P_x$, $P_z$), Q ($Q_x$, $Q_z$), a and b
OUTPUT:     L = P+Q and M = 2P
Algorithm:  $R_8=P_x$; $R_2=P_z$; $R_{10}=Q_x$; $R_{11}=Q_z$; $R_0=a$; $R_1=b$; $R_3=P_{0x}$ $R_9$ = MUL($R_8$, $R_{10}$); $R_{13}$ = MUL($R_8$, $R_{11}$); $R_{12}$ = MUL($R_2$, $R_{11}$); $R_{15}$ = MUL($R_2$, $R_{10}$);
$R_8$ = MUL($R_{13}$, $R_{13}$); $R_{11}$ = MUL($R_{12}$, $R_{12}$); $R_{14}$ = MUL($R_0$, $R_{12}$); $R_{11}$ = MUL($R_1$, $R_{11}$);
$R_{10}$ = SUB($R_{13}$, $R_{15}$); $R_2$ = ADD($R_{13}$, $R_{15}$); $R_9$ = ADD($R_9$, $R_{14}$); $R_{11}$ = ADD($R_{11}$, $R_{11}$);
$R_9$ = MUL($R_2$, $R_9$); $R_{14}$ = MUL($R_{14}$, $R_{12}$);
$R_9$ = ADD($R_9$, $R_9$); $R_{11}$ = ADD($R_{11}$, $R_{11}$); $R_2$ = SUB($R_8$, $R_{14}$);
$R_9$ = ADD($R_9$, $R_{11}$); $R_{14}$ = ADD($R_8$, $R_{14}$);
$R_2$ = MUL($R_2$, $R_2$); $R_{13}$ = MUL($R_{12}$, $R_{13}$); $R_{12}$ = MUL($R_{12}$, $R_{12}$); $R_8$ = MUL($R_{11}$, $R_{13}$);
$R_{15}$ = MUL($R_{11}$, $R_{12}$); $R_{11}$ = MUL($R_{10}$, $R_{10}$); $R_{13}$ = MUL($R_{13}$, $R_{14}$); $R_{12}$ = MUL($R_3$, $R_{11}$);
$R_{13}$ = ADD($R_{13}$, $R_{13}$); $R_8$ = ADD($R_8$, $R_8$); $R_{13}$ = ADD($R_{13}$, $R_{13}$);
$R_8$ = SUB($R_2$, $R_8$); $R_{10}$ = SUB($R_9$, $R_{12}$); $R_2$ = ADD($R_{13}$, $R_{15}$);

$L_x$ = $R_{10}$; $L_z$= $R_{11}$; $M_x$= $R_8$; $M_z$= $R_2$;
return L and M;

FIG. 18

INPUTS:     $P_0(P_{0x}, P_{0y})$, $L(L_x, L_z) = k\,P_0$, $M(M_x, M_z) = (k+1)\,P_0$, a and b
OUTPUT:     $Q = (Q_x, Q_y) = k\,P_0$ under affine coordinate
Algorithm:  $R_3 = P_{0x}$; $R_4 = P_{0y}$; $R_0 = a$; $R_1 = b$; $R_8 = L_x$; $R_2 = L_z$; $R_{10} = M_x$; $R_{11} = M_z$;

$R_9 = \text{MUL}(R_3, R_2)$; $R_{13} = \text{MUL}(R_3, R_8)$;
$R_{12} = \text{SUB}(R_9, R_8)$; $R_9 = \text{ADD}(R_9, R_8)$;
$R_{12} = \text{MUL}(R_{12}, R_{12})$; $R_{14} = \text{MUL}(R_2, R_2)$; $R_{12} = \text{MUL}(R_{10}, R_{12})$; $R_{10} = \text{MUL}(R_0, R_2)$;
$R_{14} = \text{ADD}(R_{14}, R_{14})$; $R_{13} = \text{ADD}(R_{10}, R_{13})$;
$R_8 = \text{MUL}(R_8, R_2)$; $R_{13} = \text{MUL}(R_9, R_{13})$; $R_9 = \text{MUL}(R_4, R_{11})$; $R_{13} = \text{MUL}(R_{11}, R_{13})$;
$R_2 = \text{MUL}(R_1, R_{14})$; $R_{10} = \text{MUL}(R_9, R_{14})$; $R_2 = \text{MUL}(R_{11}, R_2)$; $R_8 = \text{MUL}(R_9, R_8)$;
$R_{13} = \text{ADD}(R_{13}, R_2)$; $R_8 = \text{ADD}(R_8, R_8)$; $R_{13} = \text{SUB}(R_{13}, R_{12})$;
$R_{11} = \text{INV}(R_{10})$; // field inversion
$R_6 = \text{MUL}(R_8, R_{11})$; $R_7 = \text{MUL}(R_{13}, R_{11})$;

$Q_x = R_6$; $Q_y = R_7$;

return Q;

FIG. 19

PRIME FIELD ELLIPTIC CURVE CRYPTOGRAPHY PROCESSOR

CROSS-REFERENCE TO RELATED APPLICATIONS

The present disclosure is a continuation of U.S. patent application Ser. No. 12/713,297 (now U.S. Pat. No. 8,358, 779), filed on Feb. 26, 2010, which claims the benefit of U.S. Provisional Patent Application Ser. No. 61/157,588, filed on Mar. 5, 2009. The entire disclosures of the above referenced applications are incorporated by reference.

FIELD

The present disclosure relates generally to cryptography. More particularly, the present disclosure relates to elliptic curve cryptography.

BACKGROUND

This background section is intended solely as background information to assist in the understanding of the present disclosure. Nothing in this background section is intended to be an admission of, or to be construed as, prior art against the present disclosure.

The ever-growing demand to transfer confidential information securely over unsecured communication networks has spurred the development of cryptographic technologies such as public key cryptography. According to public key cryptography, each communication is encrypted with one of a pair of keys and decrypted with the other key in the pair. One of the keys, referred to as the "public" key, is easily derived from the other key, referred to as the "private" key, while it is extremely difficult to derive the private key from the public key. Several technologies have been developed to generate these key pairs. One such technology is referred to as "elliptic curve cryptography."

Elliptic curve cryptography (ECC) has become a vital technology because it offers the highest security per bit of any known public key cryptosystem. ECC is described in V. S. Miller, "Use of elliptic curves in cryptography," in Proc. Adv. Cryptolog. (Crypto '85), 1986, pp. 417-426; and N. Koblitz, "Elliptic curve cryptosystems," Math. Computations, vol. 48, pp. 203-209, 1987. The core computation in an ECC processor is the point multiplication which calculates kxP0 for a point P0 on the elliptic curve and an integer k. Detailed arithmetic descriptions can be found in A. J. Menezes, "Elliptic curve public key cryptosystems", Norwell, Mass.: Kluwer Academic, 1993 and M. Rosing, "Implementing Elliptic Curve Cryptography", Greenwich, Conn.: Manning, 1998. Tremendous research efforts have been devoted to developing efficient hardware and/or firmware implementations of the ECC processor. Examples are given in G. Agnew, R. Mullin, I. Onyszchuk and S. Vanstone, "An implementation of elliptic curve cryptosystems over $F2^{155}$," IEEE J. Selected Areas Communications, vol. 11, pp. 804-813, June 1993; S. Sutikno, A. Surya, and R. Effendi, "An implementation of ElGamal Elliptic Curve Cryptosystems," Proc. 1998 IEEE Asian Pacific Conf. Circuits and Systems (APCCAS '98), pp. 483-486, November 1998; G. Orlando and C. Paar, "A High-Performance Reconfigurable Elliptic Curve Processor for $GF(2^m)$," Proc. Cryptographic Hardware and Embedded Systems (CHES 2000), pp. 41-56, August 2000; S. Xu and L. Batina, "Efficient Implementation of Elliptic Curve Cryptosystems on an ARM7 with Hardware Accelerator," Proc. Information Security (ISC 2001), pp. 266-3279, October 2001; and T. IZU and T. Takagi, "Fast Elliptic Curve Multiplications Resistant against Side Channel Attacks."

The ECC operations can be conducted in either binary field or prime field. The binary field $GF(2^n)$ ECC is suitable for fast and compact hardware compared with a prime field $GF(p)$ ECC because there is no carry propagation for addition in a binary field. However, the prime field ECC is preferred in communication applications because of its higher security. Prior implementations have the disadvantages of high complexity and low throughput because they are designed for a general prime modulus, such as the Montgomery modular multiplier-based ECC processor, which is described in P. L. Montgomery, "Modular multiplication without trial division," Mathematics of Computation, 44(170):519-521, April 1995.

SUMMARY

In general, in one aspect, an embodiment features a prime field elliptic curve cryptography processor comprising: a prime field circuit comprising a first memory configured to store data, and an arithmetic logic unit (ALU) circuit configured to perform prime field operations upon the data; and a curve operation processor comprising a second memory configured to store instructions, and a controller configured to execute the instructions; wherein the instructions include instructions for performing curve operations upon the data, wherein the curve operations require performing the prime field operations upon the data; and wherein the instructions for performing the curve operations cause the ALU circuit to perform the prime field operations.

Embodiments of the prime field elliptic curve cryptography processor can include one or more of the following features. In some embodiments, the ALU circuit comprises: a field addition circuit configured to perform field addition and field subtraction upon the data; and a field multiplication circuit configured to perform field multiplication upon the data; wherein the curve operations require the field addition, the field subtraction, and the field multiplication; wherein the instructions for performing the curve operations cause the field addition circuit to perform the field addition and the field subtraction; and wherein the instructions for performing the curve operations cause the field multiplication circuit to perform the field multiplication. Some embodiments comprise a cryptographic apparatus comprising: the prime field elliptic curve cryptography processor; and a cryptographic module comprising an EC input circuit to provide the data for the curve operations, and an EC results circuit to receive results of the curve operations. In some embodiments, the cryptographic module further comprises: a key module configured to generate cryptographic keys based on the results of the curve operations; and a cryptographic engine configured to encrypt plaintext and decrypt ciphertext, based on the keys and the results of the curve operations. Some embodiments comprise a cryptographic device comprising the cryptographic apparatus; a private channel interface to exchange the plaintext over a private channel; and a public channel interface to exchange the ciphertext over a public channel.

In general, in one aspect, an embodiment features a method for prime field elliptic curve cryptography comprising: performing prime field operations upon data in an ALU circuit; and executing instructions in a processor, wherein the instructions include instructions for performing curve operations upon the data, wherein the curve operations require performing the prime field operations upon the data; wherein the instructions for performing the curve operations cause the ALU circuit to perform the prime field operations.

Embodiments of the method can include one or more of the following features. In some embodiments, performing the prime field operations upon the data in the ALU circuit comprises: performing field addition and field subtraction upon the data in a field addition circuit; and performing field multiplication upon the data in a field multiplication circuit; wherein the curve operations require the field addition, the field subtraction, and the field multiplication; wherein the instructions for performing the curve operations cause the field addition circuit to perform the field addition and the field subtraction; and wherein the instructions for performing the curve operations cause the field multiplication circuit to perform the field multiplication. Some embodiments comprise generating cryptographic keys based on results of the curve operations. Some embodiments comprise encrypting plaintext based on the keys and the results of the curve operations; and decrypting ciphertext based on the keys and the results of the curve operations. Some embodiments comprise exchanging the plaintext over a private channel; and exchanging the ciphertext over a public channel.

The details of one or more implementations are set forth in the accompanying drawings and the description below. Other features will be apparent from the description and drawings, and from the claims.

DESCRIPTION OF DRAWINGS

FIG. 3 shows the instruction format according to some embodiments.

FIG. 6 shows example pseudocode for the field addition circuit of FIG. 4 for a 256-bit modular addition in prime field $P_{256}$ according to some embodiments.

FIGS. 9 and 10 show example pseudocode for the field multiplication circuit of FIG. 7 for a 256-bit modular multiplication in prime field $P_{256}$ according to some embodiments. FIG. 9 shows pseudocode for partial multiplication, while FIG. 10 shows pseudocode for reduction.

FIGS. 14 and 15 show example pseudocode for a curve operation processor for point addition and point doubling, respectively.

FIG. 16 shows example pseudocode for a curve operation processor for point multiplication.

FIG. 17 shows example pseudocode for a pre-computation stage for point multiplication.

FIG. 18 shows example pseudocode for a main loop stage for point multiplication.

FIG. 19 shows example pseudocode for a post-computation stage for point multiplication.

Figure 1:
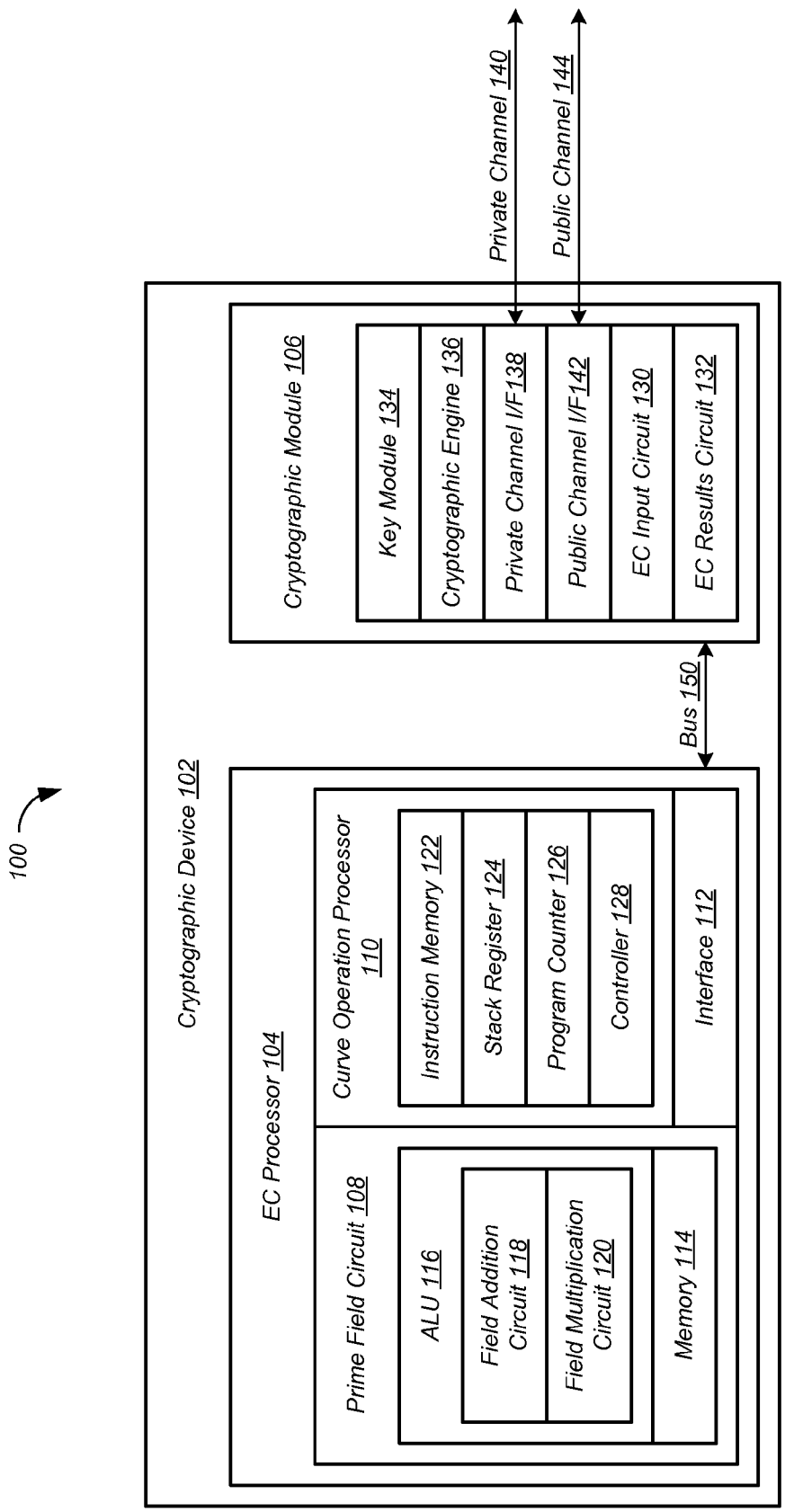
FIG. 1 shows elements of a prime field elliptic curve cryptography system comprising a cryptographic device according to some embodiments.

The leading digit(s) of each reference numeral used in this specification indicates the number of the drawing in which the reference numeral first appears.

DETAILED DESCRIPTION

The subject matter of the present disclosure relates to efficient elliptic curve (EC) processor design for specific prime moduli, which is the case in many real applications. A microcode approach is used to realize elliptic curve operations in the EC processor. Based on the disclosed 16-bit instruction set, the curve operations in EC, including point addition, point doubling and point multiplication, are implemented as sequences of microcode. In addition, two efficient field arithmetic logic units (ALU), specifically a field adder and a field multiplier, are disclosed to form the foundation of the EC processor. All the NIST-recommended prime fields are supported. As a result, high throughput curve operation is achieved with reasonable silicon complexity. For example, the disclosed ECC processor can complete 650 point multiplication operations per second with a 200 MHz clock.

FIG. 1 shows elements of a prime field elliptic curve cryptography system 100 comprising a cryptographic device 102 according to some embodiments. Although in the described embodiments the elements of cryptographic device 102 are presented in one arrangement, other embodiments may feature other arrangements, as will be apparent to one skilled in the relevant arts based on the disclosure and teachings provided herein. For example, elements of cryptographic device 102 can be implemented in hardware, software, or combinations thereof.

Referring to FIG. 1, cryptographic device 102 includes a prime field elliptic curve cryptography (EC) processor 104 and a cryptographic module 106 in communication over a bus 150. EC processor 104 includes a prime field circuit 108, a curve operation processor 110, and an interface 112. In some embodiments, bus 150 is implemented as an advanced peripheral bus (APB) and interface 112 is implemented as an APB input/output interface. Prime field circuit 108 includes a memory 114 to store data and an arithmetic logic unit (ALU) circuit 116 to perform prime field operations upon the data, as described below.

ALU circuit 116 includes a field addition circuit 118 configured to perform field addition and field subtraction upon the data, and a field multiplication circuit 120 configured to perform field multiplication upon the data. In some embodiments, memory 114 includes a 16×256-bit dual-port synchronous register file constructed as 16 field registers and a 256-bit key register. The register file is used to store intermediate results from elliptic curve operations. The key register is used for point multiplication.

Curve operation processor 110 includes an instruction memory 122 to store instructions, a stack register 124, a program counter 126, and a controller 128 to execute the instructions stored in instruction memory 122. The instructions include instructions for performing curve operations upon the data. The curve operations include point addition, point doubling, point multiplication, and the like.

Cryptographic module 106 includes an EC input circuit 130 to provide input data for the curve operations to EC processor 104, and an EC results circuit 132 to receive results of the curve operations from EC processor 104. Cryptographic module 106 also includes a key module 134 configured to generate cryptographic keys based on the results of the curve operations, and a cryptographic engine 136 configured to encrypt plaintext, and to decrypt ciphertext, based on the keys and the results of the curve operations.

Cryptographic module 106 further includes a private channel interface 138 to exchange the plaintext over a private channel 140, and a public channel interface 142 to exchange the ciphertext over a public channel 144. Channels 140 and 144 can be implemented as one or more communication channels, storage devices, or the like. The communication channels can be implemented as networks, direct links, or the like. The networks can be implemented as wide-area networks such as the Internet, local-area networks (LAN), or the like.

Figure 2:
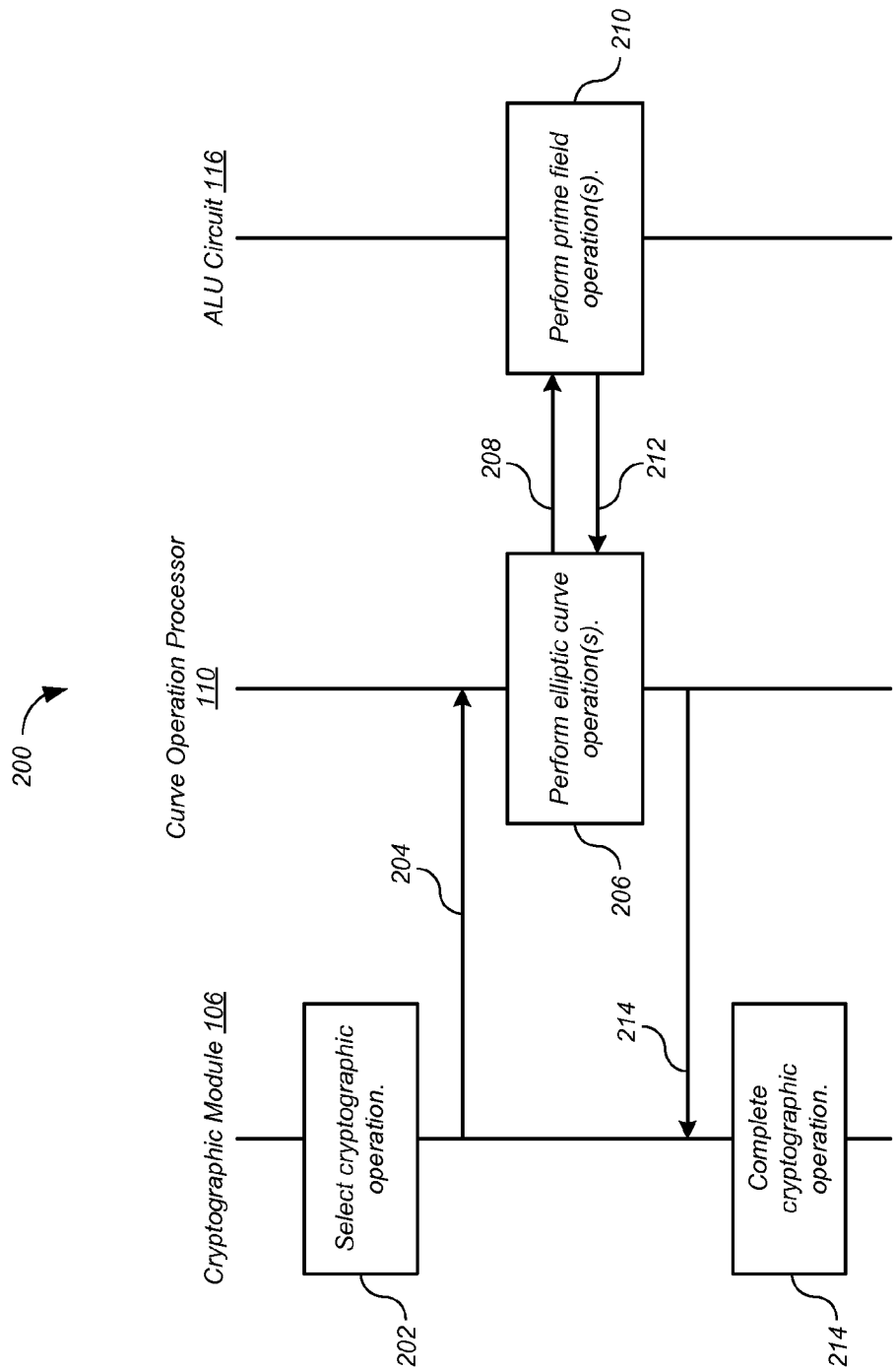
FIG. 2 shows a process for the cryptographic device of FIG. 1 according to some embodiments.

FIG. 2 shows a process 200 for cryptographic device 102 of FIG. 1 according to some embodiments. Although in the described embodiments the elements of the disclosed processes are presented in one arrangement, other embodiments may feature other arrangements. For example, in various embodiments, some or all of the steps of the disclosed processes can be executed in a different order, concurrently, and the like.

Referring to FIG. 2, at 202 cryptographic module 106 of cryptographic device 102 selects a cryptographic operation. For example, the cryptographic operations can include generating cryptographic keys, encrypting plaintext, decrypting ciphertext, and the like. At 204, EC input circuit 130 of cryptographic module 106 provides input data for the selected operation to EC processor 104 over bus 150 and interface 112.

In response, at 206, curve operation processor 110 performs elliptic curve operations on the input data. The curve operations can include point addition, point doubling, point multiplication, and the like. The curve operations require performing prime field operations upon the data. At 208, the instructions for performing the curve operations call ALU circuit 116, causing ALU circuit 116 to perform the prime field operations 210. In particular, the curve operations require field addition, field subtraction, field multiplication, and the like. For example, the instructions for performing the curve operations cause field addition circuit 118 to perform the field addition and field subtraction, and cause field multiplication circuit 120 to perform field multiplication. At 212, the results of the prime field operations are returned to curve operation processor 110.

After completion of the elliptic curve operations, at 214 EC processor 104 provides the results of the elliptic curve operations to EC results circuit 132 of cryptographic module 106 over bus 150 and interface 112. Cryptographic module 106 then completes the selected operation, at 216.

In the described embodiments curve operation processor 110 is implemented using the microcode described below. In other embodiments, curve operation processor 110 is implemented in other ways. For example, curve operation processor 110 can be implemented as a finite state machine or the like. The instruction set of curve operation processor 110 is shown in Table 1.

TABLE 1

| Operation | Type | Description |
|---|---|---|
| NOP | I | Indicate idle state or the ending of the procedure. |
| ECP_MUL | II | Modular multiplier. |
| ECP_ADD, ECP_SUB | II | Modular addition and subtraction. |
| ECP_LOAD_KEY, KEY_REG_LSHIFT, CMP_KEY_MSB | II | Key register related operations. |
| ECP_MV_ELM | II | Move a field element. |
| ECP_SET_CNT, | I | Initialize loop counter and |

TABLE 1-continued

| Operation | Type | Description |
|---|---|---|
| ECP_DEC_CNT | | decrease the counter value by 1. |
| JMP, JMPZ, JMPNZ | I | Jump instructions. |

Each instruction is 16 bits in width. FIG. 3 shows the format of the instructions according to some embodiments. The instruction set operations are explained as follows:

1) Jump instructions: JMP—jump unconditionally, JMPZ—jump if the zero flag is one, and JMPNZ—jump if the zero flag is zero.

2) Prime field arithmetic instructions: ECP_MUL, ECP_ADD and ECP_SUB. Each instruction accepts two source registers in operand1 and operand2, and one destination register in operand 4.

3) Key register manipulation instructions: ECP_LOAD_KEY, KEY_REG_SHFL, and CMP_KEY_MSB.

Referring again to FIG. 1, controller 128 is responsible for all control within EC processor 104. When a start command is received from interface 112, a finite state machine in controller 128 is triggered to execute a sequence of microcode, and issues interruption and appropriate status signals once the command is executed successfully.

Program counter 126 is implemented as a processor register that indicates the address in instruction memory 122 of the next instruction to be executed. The value in the processor register is incremented automatically after fetching an instruction, so that the instructions are normally retrieved sequentially. With certain instructions, such as jump, return and subroutine calls, a new start address is loaded into the register. Program counter 126 has four working modes:

1) Initialization mode: the starting point of different operation services.

2) Increment mode: the processor register value is incremented.

3) Branch mode: the next processor register value is the current value plus the jump steps.

4) Push/Pop mode: The processor register is set as the value of the stack register top.

Now field addition circuit 118 and field multiplication circuit 120 of ALU circuit 116 are described in detail. Field addition circuit 118 calculates (A+B) mod P, and field multiplication circuit 120 calculates (A×B) mod P, where P is the modulus, and A and B are two integers in the range 0 to P−1. The FIPS 186-2 standard recommends elliptic curves over five prime fields with moduli given by equations (1)-(5).

$$P_{192}=2^{192}-2^{64}-1 \qquad (1)$$

$$P_{224}=2^{224}-2^{96}+1 \qquad (2)$$

$$P_{256}=2^{256}-2^{224}+2^{192}+2^{96}-1 \qquad (3)$$

$$P_{384}=2^{384}-2^{128}-2^{96}+2^{32}-1 \qquad (4)$$

$$P_{521}=2^{521}-1 \qquad (5)$$

Note that these primes can be written as the sum or difference of a small number of powers of 2. Furthermore, the powers appearing in these expressions are all multiples of 32. These special properties can be exploited to yield fast modular adder and multiplier architectures such as those described below.

Figure 4:
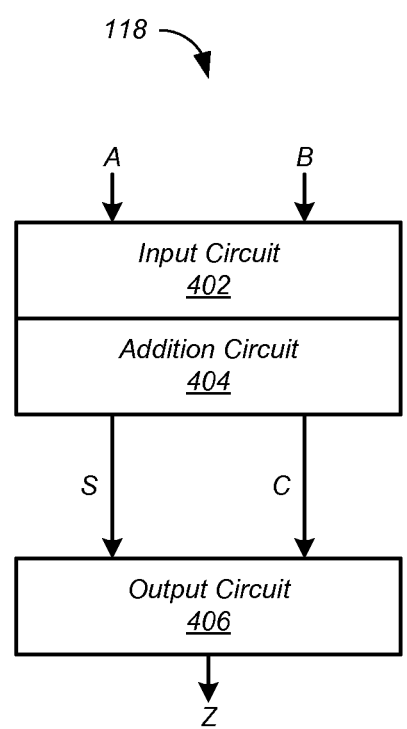
FIG. 4 shows elements of a field addition circuit according to some embodiments.

Now field addition circuit 118 is described in detail. FIG. 4 shows elements of field addition circuit 118 according to some embodiments. Although in the described embodiments the elements of field addition circuit 118 are presented in one arrangement, other embodiments may feature other arrangements, as will be apparent to one skilled in the relevant arts based on the disclosure and teachings provided herein. For example, elements of field addition circuit 118 can be implemented in hardware, software, or combinations thereof. Referring to FIG. 4, field addition circuit 118 includes an input circuit 402, an addition circuit 404, and an output circuit 406.

Figure 5:
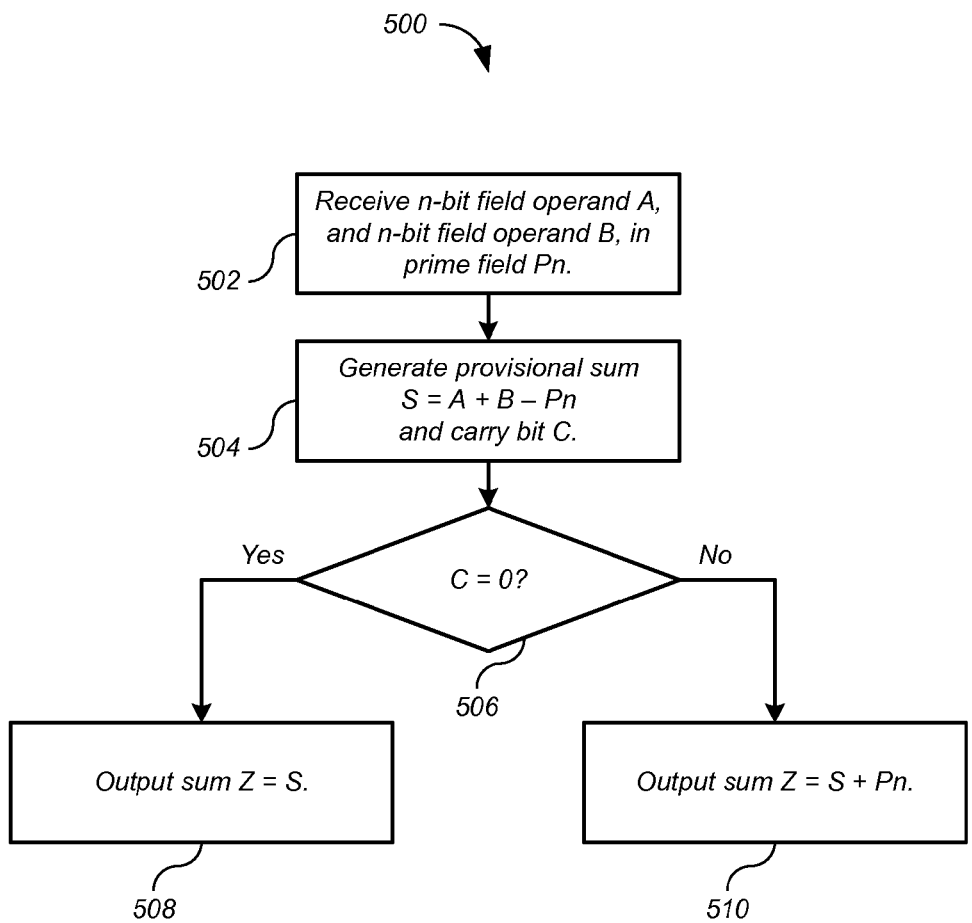
FIG. 5 shows a process for the field addition circuit of FIG. 4 according to some embodiments.

FIG. 5 shows a process 500 for field addition circuit 118 of FIG. 4 according to some embodiments. Referring to FIG. 5, at 502 input circuit 402 receives an n-bit field operand A, and an n-bit field operand B, in a prime field Pn. At 504, addition circuit 404 generates a provisional sum S=A+B−Pn and a carry bit C. At 506, if the value of carry bit C is zero (C=0), then at 508 output circuit 406 outputs a sum Z, where Z=S. But if at 506 the value of carry bit C is one (C=1), then at 510 output circuit 406 outputs a sum Z, where Z=S+Pn.

The detailed operation of field addition circuit 118 can be expressed as pseudocode. FIG. 6 shows example pseudocode for field addition circuit 118 for a 256-bit modular addition in prime field $P_{256}$ according to some embodiments. It can be shown that the result of (A+B−$P_{256}$) is in the range of −$P_{256}$ to +$P_{256}$. Therefore, as shown in FIGS. 5 and 6, S is returned directly if carry bit C is zero, and S+$P_{256}$ is returned otherwise. With one 32-bit full adder engine, one 256-bit modular addition requires 8 cycles, as compared with 16 cycles for conventional techniques.

Figure 7:
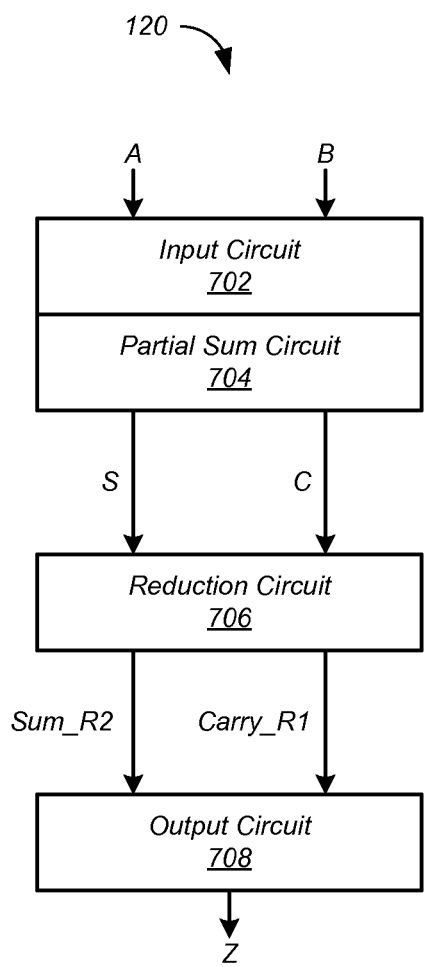
FIG. 7 shows elements of a field multiplication circuit according to some embodiments.

Now field multiplication circuit 120 is described in detail. FIG. 7 shows elements of field multiplication circuit 120 according to some embodiments. Although in the described embodiments the elements of field multiplication circuit 120 are presented in one arrangement, other embodiments may feature other arrangements, as will be apparent to one skilled in the relevant arts based on the disclosure and teachings provided herein. For example, elements of field multiplication circuit 120 can be implemented in hardware, software, or combinations thereof. Referring to FIG. 7, field multiplication circuit 120 includes an input circuit 702, a partial sum circuit 704, a reduction circuit 706, and an output circuit 708.

Figure 8:
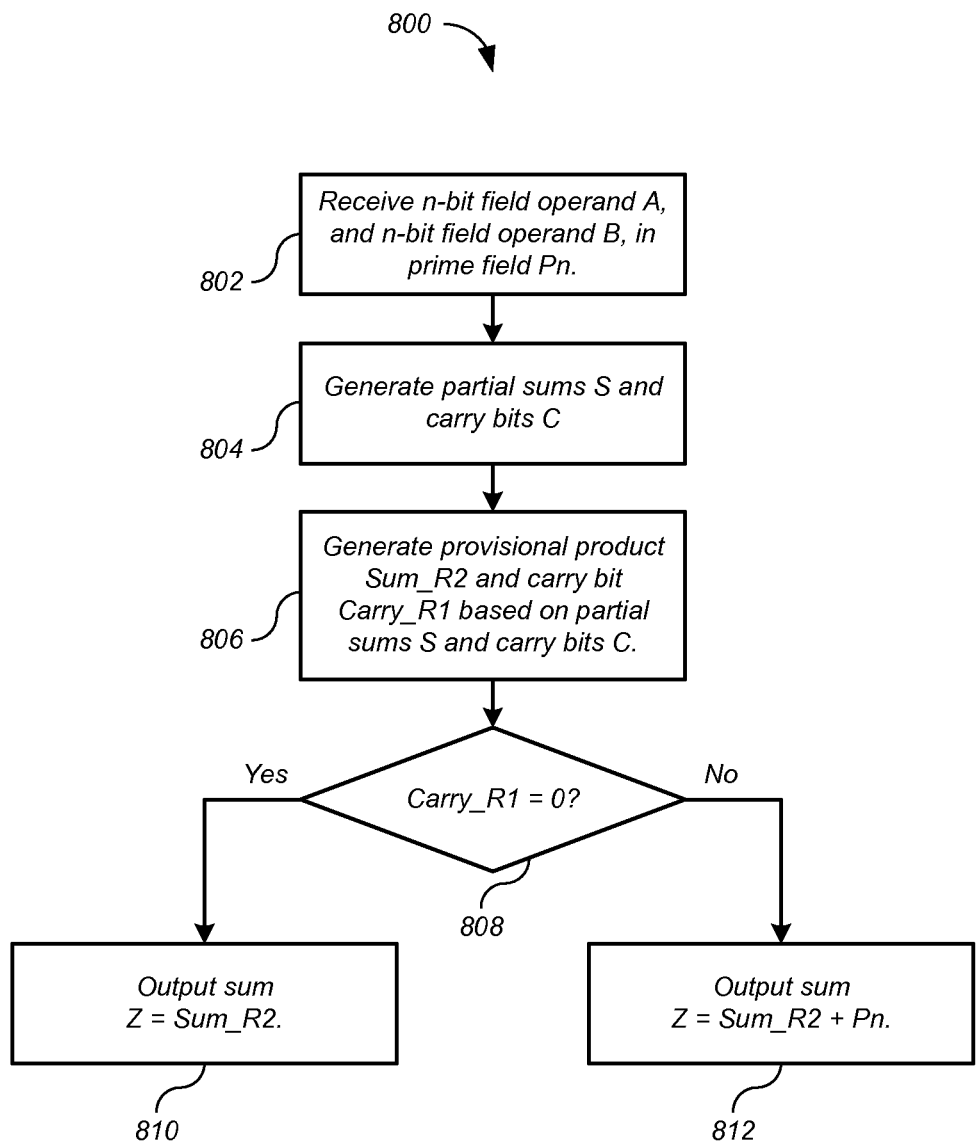
FIG. 8 shows a process for the field multiplication circuit of FIG. 7 according to some embodiments.

FIG. 8 shows a process 800 for field multiplication circuit 120 of FIG. 7 according to some embodiments. Referring to FIG. 8, at 802 input circuit 702 receives an n-bit field operand A, and an n-bit field operand B, in a prime field Pn. At 804, partial sum circuit 704 generates a plurality of partial sums S and a plurality of carry bits C. At 806, reduction circuit 706 generates a provisional product Sum_R2 and a carry bit Carry_R1 based on partial sums S and carry bits C. At 808, if the value of carry bit Carry_R1 is zero (Carry_R1=0), then at 810 output circuit 708 outputs a product Z, where Z=Sum_R2. But if at 808 the value of carry bit Carry_R1 is one (Carry_R1=1), then at 812 output circuit 708 outputs a product Z, where Z=Sum_R2+Pn.

The detailed operation of field multiplication circuit 120 can be expressed as pseudocode. FIGS. 9 and 10 show example pseudocode for field multiplication circuit 120 for a 256-bit modular multiplication in prime field $P_{256}$ according to some embodiments. Note that the product of the two 256-bit integers is a 512-bit integer. FIG. 9 shows pseudocode for partial multiplication, while FIG. 10 shows pseudocode for reduction.

Figure 11:
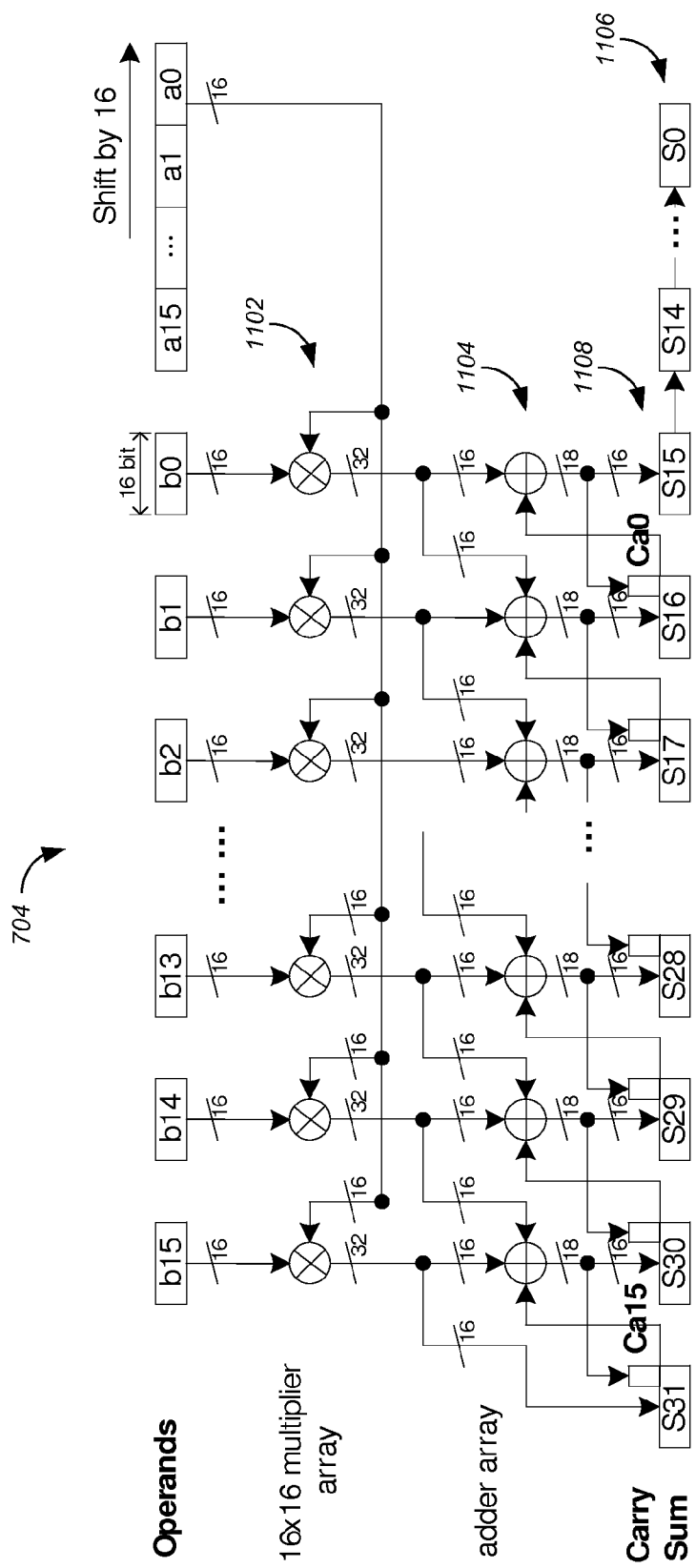
FIG. 11 shows detail of the partial sum circuit of FIG. 7 according to some embodiments.

FIG. 11 shows detail of partial sum circuit 704 of FIG. 7 according to some embodiments. Partial sum circuit 704 differs from conventional multipliers in at least two aspects. First, the add-shift operation in a conventional multiplier requires finishing the large operand addition in one cycle. However, the add-shift operation in partial sum circuit 704 is performed via a pipelined architecture that includes a 16×16 multiplier array 1002, an adder array 1004, and two register arrays 1106 and 1108 for partial sums S and carry bits C, respectively. Second, partial sum circuit 704 calculates only a partial product of A and B, leaving the rest of the computation to the reduction stage. This approach reduces the multiplication time to 16 clock cycles, as compared with 32 cycles for conventional techniques.

Figure 12:
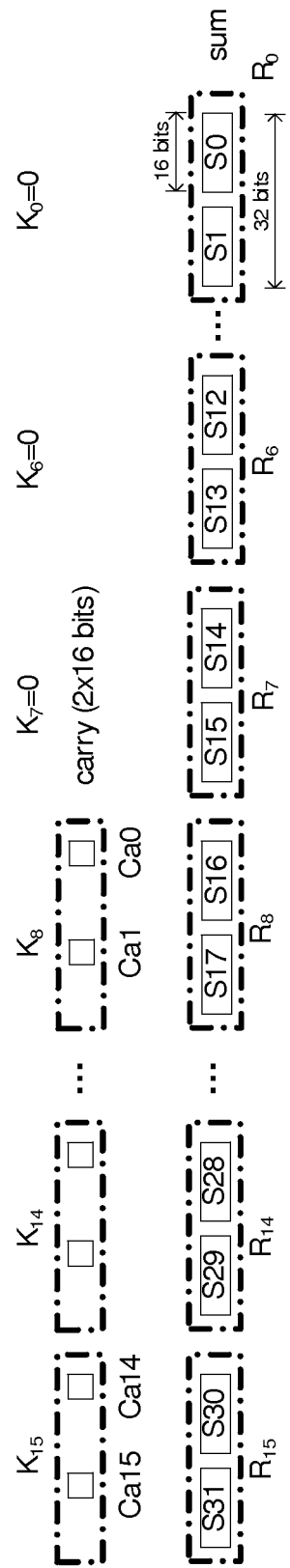
FIG. 12 illustrates the first reduction stage of the reduction circuit of FIG. 7.

The provisional product S and carry bits C from partial sum circuit 704 are fed to reduction circuit 706 of FIG. 7, which implements a two-stage reduction, as described by the pseudocode of FIG. 10. In the first stage, provisional product S and carry bits C are re-organized as two 256-bit integers R and K, as illustrated in FIG. 12. In the second stage, 18 new 256-bit integers $X_1$, $X_2$, ..., $X_9$ and $Y_1$, $Y_2$, ..., $Y_9$ are generated based on integers R and K. It can be shown that the result {Carry_R2, Sum_R2} from the two-step reduction is in the range −$P_{256}$ to +$P_{256}$. Finally, the result is returned based on the carry bit Carry_R2.

Figure 13:
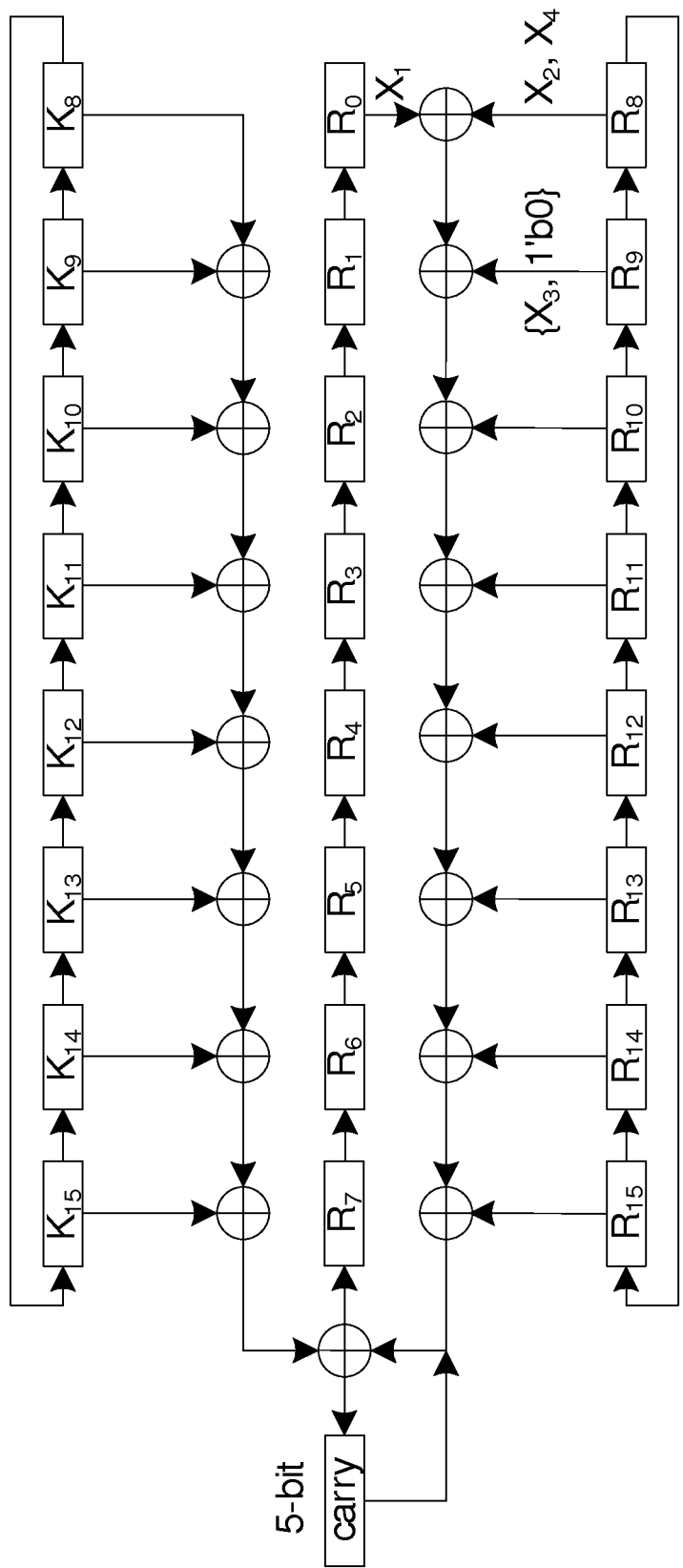
FIG. 13 shows detail of the first reduction stage of the reduction circuit of FIG. 7 according to some embodiments.

FIG. 13 shows detail of the first reduction stage of reduction circuit 706 of FIG. 7 according to some embodiments. To minimize hardware complexity, the flip-flops are configured as shift registers, and the additions are performed word by word (32-bit). Thus the first reduction stage takes 8 clock cycles to complete. The second reduction stage also takes 8 clock cycles to complete.

Ignoring the load/unload cycles, field multiplication circuit 120 takes 32 clock cycles, including 16 clock cycles for multiplication and 16 clock cycles for reduction, to finish 256-bit modular multiplication. With a 32-bit bus interface, it takes 16 clock cycles to load two incoming operands and 8 cycles to unload the result. However, those load/unload cycles can be concealed by performing many consecutive multiplications.

Now example elliptic curve operations provided by curve operation processor 110 are described, including point addition, point doubling, and point multiplication. First, example point addition and point doubling are described. Consider two distinct points J and K on the elliptic curve defined by three parameters a, b and p such that J=($x_J$, $y_J$) and K=($x_k$, $y_k$) in affine coordinates. Let L=J+K where L=($x_L$, $y_L$). Then $x_L$=$s^2$−$x_J$−$x_K$ mod p, and $y_L$=−$y_J$+s($x_J$−$x_L$) mod p, where s=($y_J$−$y_K$)/($x_J$−$x_K$) mod p. Let M=2J. Then $x_M$=$t^2$−2$x_J$ mod p and $y_M$=−$y_J$+t($x_J$−$x_L$) mod p, where t=(3$x_J^2$+a)/(2$y_J$) mod p. Therefore, in affine coordinates, both point addition and point doubling require a few multiplications and one field inversion. FIGS. 14 and 15 show example pseudocode for curve operation processor 110 for point addition and point doubling, respectively, where $R_i$ (i=0, 1, ..., 15) represents 16 256-bit registers used for storing intermediate results.

Now example point multiplication is described. Point multiplication computes another point Q by multiplying k and P0 (Q=k×P0), where both P0 and Q are points on the elliptic curve, and k is a random number. To combat side channel attacks, a Montgomery ladder approach is used, as described in P. L. Montgomery, "Speeding the Pollard and elliptic curve methods for factorizations," Math. Comput., vol. 48, pp. 243-264, 1987. FIG. 16 shows example pseudocode for curve operation processor 110 for point multiplication.

Referring to FIG. 16, the pseudocode for point multiplication includes operations for point addition and point doubling. To minimize the number of time-consuming inversion operations, the point addition and point doubling are performed under projective coordinates. The procedure consists of three stages.

In the first stage, pre-computation, the procedure calculates the X and Z coordinates of $P_0$ and $2P_0$. FIG. 17 shows example pseudocode for the pre-computation stage.

In the second stage, the main loop, the procedure calculates $kP_0$ by repeating point addition and point doubling. To save computing time, only the X and Z coordinate of each point are calculated. FIG. 18 shows example pseudocode for the main loop stage.

In the third stage, post-computation, based on the X and Z coordinate of $kP_0$, the procedure recovers the X and Y coordinate of $kP_0$ under affine coordinates. FIG. 19 shows example pseudocode for the post-computation stage.

The pseudocode described above, and in the drawings, is implemented with the instruction set defined in Table 1 above. Note that field inversion is far more expensive than field multiplication, and is implemented as a sub-routine with microcode based on Fermat's little theorem. A guideline of the microcode design is to perform field multiplication or field addition/subtraction operations as consecutively as possible to minimize the data load/unload cycle penalty mentioned above.

Simulation results show that driven by the disclosed microcode, EC processor 104 can finish 650 point multiplication operations in the 256-bit prime field per second with a 200 MHz clock frequency. An ASIC design of field multiplication circuit 120 has been implemented using the 65-nm CMOS standard cell library, and a Synopsys Design Compiler for synthesis. The result shows that EC processor 104 can run at a 200 MHz clock frequency with a 70K gate count.

Various embodiments can be implemented in digital electronic circuitry, or in computer hardware, firmware, software, or in combinations of them. Embodiments can be implemented in a computer program product tangibly embodied in a machine-readable storage device for execution by a programmable processor; and method steps can be performed by a programmable processor executing a program of instructions to perform functions by operating on input data and generating output. Embodiments can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations have been described. Nevertheless, it will be understood that various modifications may be made without departing from the scope of the disclosure. Accordingly, other implementations are within the scope of the following claims.

What is claimed is:

1. A system comprising:
a processor configured to execute instructions for performing elliptic curve operations on data, wherein the elliptic curve operations include field operations performed in a prime field;
a field addition circuit configured to perform a field addition on the data in the prime field in response to the instructions requiring the field addition, wherein the field addition circuit comprises
an input circuit configured to receive a first n-bit field operand and a second n-bit field operand in the prime field;
an addition circuit configured to generate a provisional sum and a carry bit, wherein the provisional sum is a difference between an order of the prime field and a first sum of the first n-bit field operand and the second n-bit field operand; and
an output circuit configured to output a second sum, wherein the second sum is the provisional sum when the carry bit is zero, and wherein the second sum is a sum of the provisional sum and the order of the prime field when the carry bit is one;
a field multiplication circuit configured to perform a field multiplication on the data in the prime field in response to the instructions requiring the field multiplication;
a key module configured to generate keys based on results of the elliptic curve operations; and
a cryptographic engine configured to (i) encrypt plaintext based on the keys or (ii) decrypt ciphertext based on the keys.

2. A system comprising:
a processor configured to execute instructions for performing elliptic curve operations on data, wherein the elliptic curve operations include field operations performed in a prime field;
a field addition circuit configured to perform a field addition on the data in the prime field in response to the instructions requiring the field addition;
a field multiplication circuit configured to perform a field multiplication on the data in the prime field in response to the instructions requiring the field multiplication, wherein the field multiplication circuit comprises
an input circuit configured to receive a first n-bit field operand and a second n-bit field operand in the prime field;
a partial sum circuit configured to generate, based on the first n-bit field operand and the second n-bit field operand, (i) a plurality of partial sums and (ii) a plurality of carry bits;
a reduction circuit configured to generate, based on (i) the plurality of partial sums and (ii) the plurality of carry bits, (a) a provisional product and (b) a carry bit; and
an output circuit configured to output a product, wherein the product is the provisional product when the carry bit is zero, and wherein the product is a sum of the provisional product and an order of the prime field when the carry bit is one;
a key module configured to generate keys based on results of the elliptic curve operations; and
a cryptographic engine configured to (i) encrypt plaintext based on the keys or (ii) decrypt ciphertext based on the keys.

3. The system of claim 1, further comprising an interface configured to (i) exchange the plaintext over a private channel or (ii) exchange the ciphertext over a public channel.

4. The system of claim 2, further comprising an interface configured to (i) exchange the plaintext over a private channel or (ii) exchange the ciphertext over a public channel.

5. A method comprising:

using a processor, executing instructions for performing elliptic curve operations on data, wherein the elliptic curve operations include field operations performed in a prime field;

performing a field addition on the data in the prime field in response to the instructions requiring the field addition, wherein performing the field addition comprises receiving a first n-bit field operand and a second n-bit field operand in the prime field;

generating a provisional sum and a carry bit, wherein the provisional sum is a difference between an order of the prime field and a first sum of the first n-bit field operand and the second n-bit field operand; and generating a second sum, wherein the second sum is the provisional sum when the carry bit is zero, and wherein the second sum is a sum of the provisional sum and the order of the prime field when the carry bit is one;

performing a field multiplication on the data in the prime field in response to the instructions requiring the field multiplication;

generating keys based on results of the elliptic curve operations; and encrypting plaintext based on the keys or decrypting ciphertext based on the keys.

6. A method comprising:

using a processor, executing instructions for performing elliptic curve operations on data, wherein the elliptic curve operations include field operations performed in a prime field;

performing a field addition on the data in the prime field in response to the instructions requiring the field addition;

performing a field multiplication on the data in the prime field in response to the instructions requiring the field multiplication, wherein performing the field multiplication comprises receiving a first n-bit field operand and a second n-bit field operand in the prime field;

generating, based on the first n-bit field operand and the second n-bit field operand, (i) a plurality of partial sums and (ii) a plurality of carry bits;

generating, based on (i) the plurality of partial sums and (ii) the plurality of carry bits, (a) a provisional product and (b) a carry bit; and generating a product, wherein the product is the provisional product when the carry bit is zero, and wherein the product is a sum of the provisional product and an order of the prime field when the carry bit is one;

generating keys based on results of the elliptic curve operations; and encrypting plaintext based on the keys or decrypting ciphertext based on the keys.

7. The method of claim 5, further comprising exchanging the plaintext over a private channel or exchanging the ciphertext over a public channel.

8. The method of claim 6, further comprising exchanging the plaintext over a private channel or exchanging the ciphertext over a public channel.

* * * * *